US011359941B1

(12) United States Patent
Futran et al.

(10) Patent No.: US 11,359,941 B1
(45) Date of Patent: Jun. 14, 2022

(54) SMOKE DETECTOR HOUSING AND SURFACE MOUNT

(71) Applicant: SimpliSafe, Inc., Boston, MA (US)

(72) Inventors: Chaim Carmiel Futran, Cambridge, MA (US); Scott Joseph Thorne, Allston, MA (US); Dirk Ahlgrim, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 17/320,406

(22) Filed: May 14, 2021

(51) Int. Cl.
*G01D 11/24* (2006.01)

(52) U.S. Cl.
CPC .................. *G01D 11/245* (2013.01)

(58) Field of Classification Search
CPC ........................... G01D 11/245; G08B 17/113
See application file for complete search history.

(56) References Cited

U.S. PATENT DOCUMENTS

| | | | |
|---|---|---|---|
| D340,201 S | 10/1993 | Fenne et al. | |
| D360,374 S | 7/1995 | Anderson et al. | |
| D422,521 S | 4/2000 | Morrow | |
| D675,948 S | 2/2013 | Kawaguchi et al. | |
| D811,257 S | 2/2018 | Kalyan | |
| D811,917 S | 3/2018 | Bhat | |
| D813,072 S | 3/2018 | Kalyan | |
| D885,224 S | 5/2020 | Liu | |
| D887,300 S | 6/2020 | Fujiwara et al. | |
| 11,238,716 B2 * | 2/2022 | Wu ..................... | G08B 17/113 |
| 2018/0149581 A1 * | 5/2018 | Lo ........................ | G08B 17/107 |
| 2021/0356104 A1 * | 11/2021 | Thorne ................ | G03B 17/561 |

FOREIGN PATENT DOCUMENTS

| | | | | |
|---|---|---|---|---|
| CN | 110766906 B * | 3/2021 | ........... | G08B 17/103 |
| EM | 002163550-0001 S | 1/2013 | | |
| EM | 002163550-0002 S | 1/2013 | | |
| EM | 002163550-0003 S | 1/2013 | | |
| EM | 002163550-0004 S | 1/2013 | | |
| EM | 002163550-0005 S | 1/2013 | | |
| EM | 002163550-0006 S | 1/2013 | | |
| EP | 3042365 B1 * | 3/2018 | ............. | G08B 17/06 |
| EP | 3671680 A1 * | 6/2020 | ........... | G08B 17/113 |
| JP | 2018005497 A * | 1/2018 | | |

* cited by examiner

*Primary Examiner* — Jamel E Williams
(74) *Attorney, Agent, or Firm* — Wolf, Greenfield & Sacks, P.C.

(57) ABSTRACT

A smoke detector includes detector mount that can define a cavity into which air can flow to a detector component of a detector body engaged with the detector mount. The detector mount can include a base, e.g., that defines a cavity into which air can flow and/or into which a portion of the detector body can extend, and an intermediate component that can removably engage with both the base and the detector body so the base is engaged with the detector body via the intermediate component. The intermediate component can include fins or other features to direct air flow in the cavity to one or more portions of the detector body.

20 Claims, 6 Drawing Sheets

SMOKE DETECTOR HOUSING AND SURFACE MOUNT

TECHNICAL FIELD

This application relates to smoke detectors and other surface-mounted devices, e.g., that include a replaceable battery.

BACKGROUND

Smoke detectors are commonly used to detect room or other space conditions, such as smoke, fire, carbon monoxide, and other potentially hazardous conditions. Many smoke detectors include a replaceable battery, e.g., at least for providing backup power if a mains power source is interrupted.

SUMMARY OF INVENTION

In some aspects, a smoke detector includes a mount that has two parts, e.g., a base that is configured to be secured to a surface such as a ceiling and an intermediate component that can be removably attachable to both the base and a detector body (which can house smoke, fire and other environmental sensors). The two part detector mount can provide for more flexible configurations of the detector and/or easier use of the detector, such as by allowing for easier attachment of the base to a ceiling and/or configuration of the detector for different operating conditions. For example, since the base need not include functional or other components included with the intermediate component (such as fins or other air movement influencing parts), the base can include larger, additional or otherwise more conveniently accessed features to secure the base to the surface. This can allow the base to be more easily mounted to a wider variety of different mounting surfaces. Also, since the base can be interconnected with the detector body by the intermediate component, a single base construction can be employed with differently configured detector bodies or intermediate components. This can allow for the flexible configuration of the detector for different environments, e.g., which may require different air flow requirements and/or detection features. As an example, the intermediate component can function as an adapter to permit use of the detector mount with different detector body arrangements, e.g., that may be required to provide different sensor, air flow or other features. In addition, functional features such as fins or other elements to guide air flow can be provided with the intermediate component, and so different intermediate component arrangements can be exchanged to provide different air flow or other functional effects. Thus, by interchanging intermediate components, a smoke detector can be configured for different operating environments. Moreover, since the intermediate component need not include features for mounting to a ceiling or other surface, functional features can be provided on the intermediate component in any suitable way without concern for ceiling or other surface mount limitations.

In some embodiments, a smoke detector can include a tamper indicator that is movable to prevent engagement of a detector body with a detector mount and/or positioning of a cover to at least partially cover a battery location if a battery is not held at the battery location. In some cases the detector mount can include both a base and an intermediate component, and the tamper indicator can prevent engagement of the intermediate component with the detector body if a battery is not at the battery location. The intermediate component can act as a cover, e.g., to at least partially cover the battery location, and can function to interconnect the base and the detector body. Thus, the tamper indicator and intermediate component/cover can provide a convenient indication to a user that a battery is required, e.g., because a user can learn that a battery has not been suitably placed at a battery location before the user attempts to mount the detector to a ceiling or wall. For example, in configurations where a tamper indicator prevents engagement of a detector body with a base that is mounted to a ceiling, the user will only learn that a battery is required after the user tries (and fails) to mount the detector body onto the ceiling-mounted base. This can be inconvenient, e.g., because the user may have climbed a ladder to mount the detector body to the base, only to learn that a battery is required for mounting. In contrast, in embodiments where a detector mount includes a base and intermediate component, the user can learn that a battery is required prior to climbing a ladder or otherwise acting to mount the detector body because engagement of the intermediate component with the detector body is performed (or attempted) before the detector body is mounted to a wall or ceiling. With a battery suitably provided at the battery location of the detector body, the intermediate component can be first engaged with the detector body, e.g., before climbing a ladder, and then the combined detector body and intermediate component mounted to the base.

In some embodiments, a smoke detector includes a detector body with components to detect an environmental condition at the smoke detector, such as smoke, fire, heat, combustion gasses, etc. A detector mount can be configured to support the smoke detector on a surface, and can include a base configured to be secured to the surface and an intermediate component configured to removably engage with both the base and the detector body such that the base is engaged with the detector body via the intermediate component. In some cases, the intermediate component can be required for engagement of the detector body with the base, i.e., the detector body cannot be engaged with or mounted to the base without the intermediate component.

In some cases, the intermediate component includes fins or other features to direct air flow toward a detector component of the detector body. For example, the intermediate component can include an opening through which the detector component receives air and the fins can be configured to direct air flow toward the opening. In some embodiments the opening is located at a center of the intermediate component and a portion of the detector body can extend through the opening, e.g., so the detector body can receive air through the opening.

In some embodiments, the intermediate component and the detector body are configured to engage by rotation of the intermediate component relative to the detector body. For example, the intermediate component can include a periphery having one or more tabs, e.g., that extend radially outwardly from the periphery, configured to engage with a corresponding hook on the detector body. In some cases, the detector body can include one or more hooks configured to engage with a corresponding slot of the intermediate component, e.g., by positioning a hook in a corresponding slot and rotating the intermediate component so the hook engages a portion of the intermediate component at an end of the slot. In some embodiments, the one or more hooks can each include a ramp configured to engage with and move the intermediate component away from the detector body in response to rotation of the intermediate component in a direction opposite to that in which the intermediate component and detector body can engage with each other. Such an arrangement can positively disengage the intermediate component from the detector body and signal to a user that disengagement is complete.

In some embodiments, the intermediate component and the base can be configured to engage by rotation of the intermediate component relative to the base. For example, the intermediate component can include a periphery having one or more tabs, e.g., equally spaced around the periphery, configured to engage with a corresponding hook on the base.

In some cases, the intermediate component is configured to at least partially cover a battery location of the detector body when the intermediate component is engaged with the detector body. Thus, the detector body and intermediate component can be removed together from the base, and then the intermediate component removed from the detector body to replace a battery. With the battery replacement complete, the intermediate component can be re-engaged with the detector body, and the combined detector body and intermediate component mounted to the base.

In some cases, the base can define a cavity or other space into which air can be received for delivery to a detector component of the detector base and/or into which a portion of the intermediate component or detector body can be received. In some embodiments, the base can include a sidewall with openings to permit air flow into a space defined by the base. The space can be at least partially enclosed by the base and the intermediate component, and/or a portion of the intermediate component or detector body can be received into the space.

In some embodiments, a smoke detector includes a detector body having a detector component to detect an environmental condition at the smoke detector, such as one or more detector components to detect smoke, heat, carbon monoxide, etc. A detector mount can be configured to be secured to a surface and to support the smoke detector on the surface, such as on a ceiling. The detector mount can include a base configured to be secured to the surface and that has a sidewall with one or more openings to admit air into a cavity defined at least in part by the base. The detector body can be configured to receive air from the cavity for detecting the environmental condition using the detector component. For example, air can enter the cavity via the one or more openings at the base sidewall and can flow in the cavity to an air receiving area of the detector body (e.g., one or more openings of the detector body that receives air for the detector component to operate on).

In some embodiments, the detector mount includes an intermediate component configured to removably engage with both the base and the detector body such that the base is engaged with the detector body via the intermediate component. Thus, the intermediate component can be required to mount the detector body to the base, although this is not always required. In some cases the intermediate component can be configured to direct air flow in the cavity toward an air receiving area of the detector body. For example, the intermediate component can include fins or other features to direct air flow toward the detector component of the detector body or an opening of the detector body through which air is received. In some cases, the intermediate component can be configured to at least partially enclose the cavity with the base, and a portion of the detector body can extend into the cavity defined by the base and the intermediate component. As an example, at least part of a detector component can be positioned in the cavity to receive air. The intermediate component can include an opening through which air can flow to the detector body (e.g., via an opening in the detector body), and fins or other elements can direct air flow in the cavity toward the opening in the intermediate component.

In some embodiments, a smoke detector includes a detector body with a battery location configured to receive and hold a battery for use by electronic components of the smoke detector. A detector mount can be configured to be secured to a surface and to support the smoke detector on the surface, and can be configured to releasably engage the detector body so as to at least partially cover the battery location. For example, the detector mount can include a base configured to be secured to the surface and an intermediate component configured to engage with the detector body, e.g., to at least partially cover the battery location. A tamper indicator can be configured for movement between a first position in which the tamper indicator is positioned when a battery is held at the battery location and a second position in which the tamper indicator is positioned when no battery is held at the battery location. The tamper indicator and the detector mount can be configured to prevent engagement of the detector body with the detector mount with the tamper indicator in the second position and to permit engagement of the detector body with the detector mount with the tamper indicator in the first position. For example, where the detector mount includes an intermediate component, the tamper indicator can prevent engagement of the intermediate component with the detector body if the tamper indicator is in the second position. In some cases, the base can be configured to engage with the detector body via the intermediate component, e.g., the intermediate component can be required to engage the detector body with the base.

In some embodiments, the tamper indicator is configured to pivot between the first and second positions about a pivot axis that is oriented along a direction in which the battery is received at the battery location. For example, the detector body can have an upper surface arranged in a plane and the tamper indicator can be configured to pivot between the first and second positions about a pivot axis that is oriented perpendicular to the plane. In some cases, the detector body and the detector mount can be configured to engage by relative rotation about an engagement axis, and the tamper indicator can be configured to pivot between the first and second positions about a pivot axis that is oriented along a direction parallel to the engagement axis. In some embodiments, the tamper indicator can be configured to both pivot about a pivot axis and slide along the pivot axis in movement between the first and second positions. For example, the tamper indicator can be configured to pivot within the battery location about the pivot axis between the first and second positions and to have a portion that extends out of the battery location when the tamper indicator is in the second position. In some embodiments, the tamper indicator can move along a spiral ramp between the first and second positions. The tamper indicator can be resiliently biased to move toward the second position and be configured such that a battery at the battery location holds the tamper indicator at the first position.

The tamper indicator can prevent engagement of the detector mount and the detector body in different ways. For example, the tamper indicator in the second position can be configured to prevent positioning of the detector mount suitably adjacent the detector body for engagement of the detector body with the detector mount. In some cases, the tamper indicator in the second position can be configured to prevent rotation of the detector mount relative to the detector body for engagement of the detector body with the detector mount, e.g., the tamper indicator can prevent rotation of an intermediate component relative to the detector body for engagement.

Other advantages and novel features will become apparent from the following detailed description of various non-limiting embodiments when considered in conjunction with the accompanying figures and claims.

BRIEF DESCRIPTION OF THE DRAWINGS

Aspects of the systems and methods described herein are described with reference to the following drawings in which numerals reference like elements, and wherein.

DETAILED DESCRIPTION

Aspects of the systems and methods described herein are described below by way of one or more illustrative embodiments. It should be understood that the illustrative embodiments described are not intended to limit the aspects, but rather to help show how one or more aspects can be implemented in particular examples. Also, aspects can be implemented alone and/or in combination with other aspects. For example, some aspects below relate to a detector with a two-part mount having a base and intermediate component, whereas other aspects relate to a tamper indicator that is movable based on whether a battery is received at a battery location and if not received, can prevent engagement of the detector body with a mount. In yet other aspects, a detector mount can define a cavity into which air can be received and transmitted to a detector component of the detector body. These aspects and others can be employed together, individually and/or in any suitable sub combination with each other, e.g., a detector can include a two-part mount arrangement but not include a tamper indicator and/or air receiving cavity, or a detector can employ a tamper indicator with a single part mount and/or no air receiving cavity.

In some aspects, a smoke detector can include a body (e.g., housing one or more detector components for detecting smoke, fire, heat, carbon monoxide, fine particulates and/or other environmental conditions) and a detector mount that includes two parts—a base that can be secured to a ceiling or other surface on which the detector is supported and an intermediate component that is positioned between the base and the detector body. The base and/or intermediate component can be engaged with the detector body, e.g., the base can be directly engaged with the detector body or the base can engage with the detector body via the intermediate component. The intermediate component can provide various benefits, particularly where the base engages with the detector body via the intermediate component. For example, since the intermediate component need not be configured to be secured to a ceiling, wall or other surface, the intermediate component need not have openings or other features to accommodate fasteners. Instead, the base alone may be configured with such features to allow securing of the base to a ceiling or other surface. This permits the intermediate component to be configured in any suitable way, e.g., for performing various functions, without concern for enabling the intermediate component to be secured to a ceiling or other surface. For example, in some embodiments the intermediate component can include fins, openings or other features to direct or otherwise have an effect on air flow to one or more components of the detector body. Since the intermediate component need not be configured to be secured to a ceiling, the intermediate component can have larger fins, more fins, more closely spaced fins, larger openings, etc. for interacting with air flow than would otherwise be possible. In addition, or alternately, having a separate intermediate component from a base of a detector mount can allow for the exchange of one intermediate component for another, e.g., to configure a detector for different conditions. As an example, one location may require the intermediate component to restrict air flow in comparison to another location that requires less restricted air flow. By exchanging an intermediate component for another with different functional features, the detector can be configured for different operating conditions and/or to provide other functional features. In some cases, an intermediate component and base of a detector mount can define a cavity into which air can enter and be received by one or more detector components of the detector body. Different intermediate components can allow for the configuration of different cavity features, such as enlarging or reducing the size of the cavity, providing more or less air flow restriction, etc.

Figure 1:
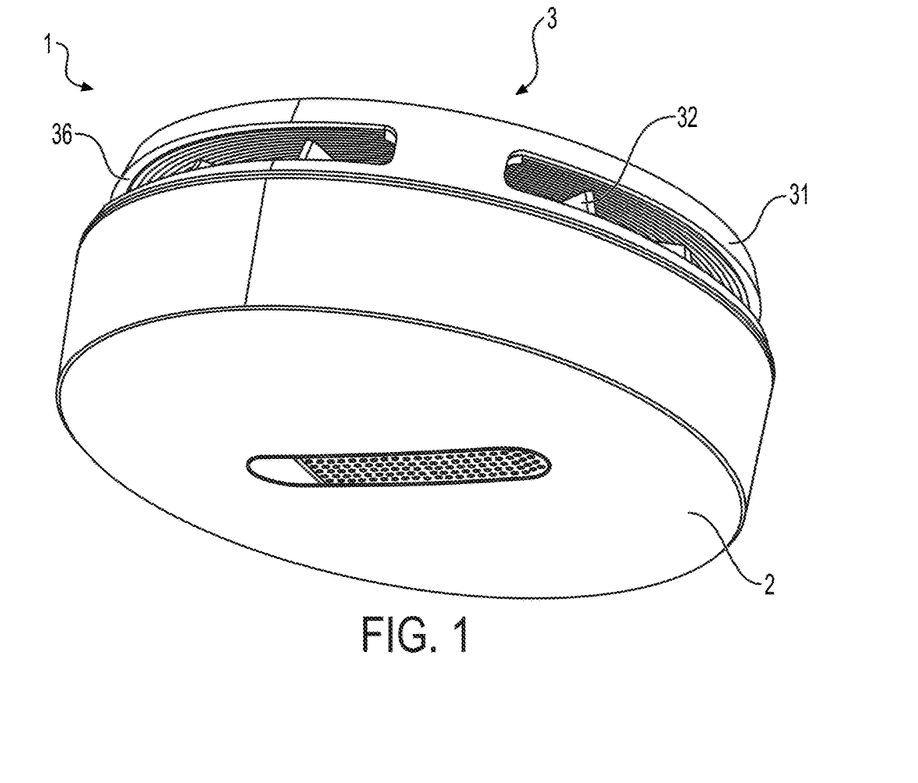
FIG. 1 is a bottom perspective view of a smoke detector in an illustrative embodiment.
Figure 2:
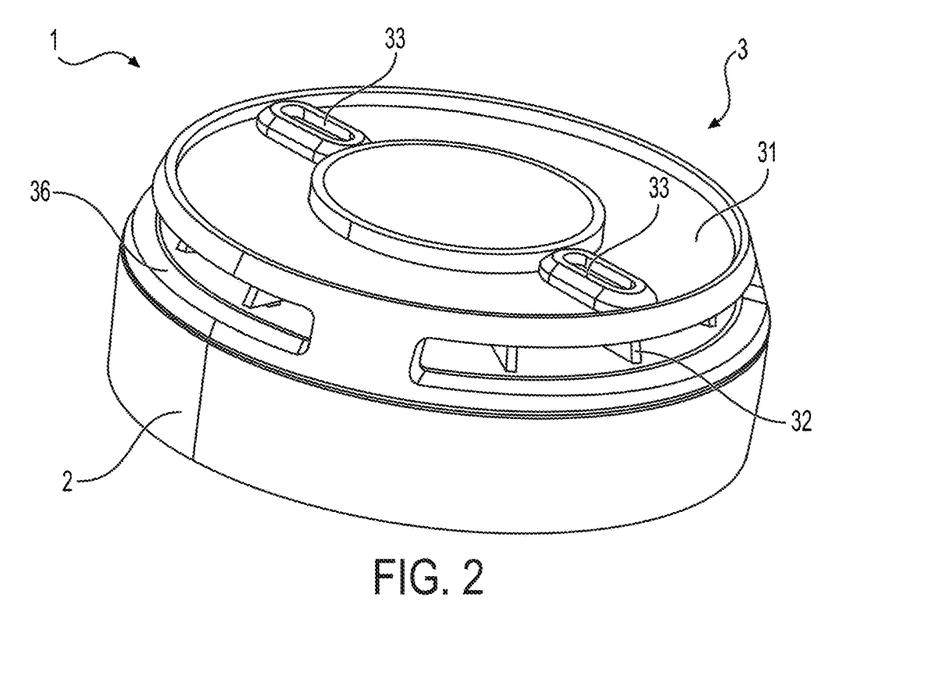
FIG. 2 is top perspective view of the FIG. 1 smoke detector.

FIGS. 1 and 2 show bottom and top perspective views of a smoke detector 1 in some embodiments. As used herein, a smoke detector can be configured to detect any suitable environmental condition, such as smoke, fire, heat, carbon monoxide, and/or fine particulates and so is not limited to detecting smoke. In some embodiments, the detector 1 includes a mount 3 that can be configured to be secured to a surface, such as a ceiling or wall, and to support the smoke detector 1 on the surface. In some embodiments, the detector mount 3 includes two separable parts such as a base 31 configured to be secured to the surface and an intermediate component 32. A detector body 2, e.g., that includes components to detect an environmental condition such as smoke, fire, heat, carbon monoxide, etc. at the smoke detector 1, can be secured to the mount 3 and thus secured to a surface. In some embodiments, the intermediate component 32 can be configured to removably engage with both the base 31 and the detector body 2 such that the base 31 is engaged with the detector body 2 via the intermediate component 32. That is, the intermediate component 32 can be configured to engage with the detector body 2, and to engage with the base 31 so the base 31 and body 2 can be secured together. However, in certain embodiments, the base 31 and body 2 can be configured so that the two can be secured together without the intermediate component 32. That is, in some embodiments, the base 31 and body 2 can be configured to engage each other directly, without requiring the intermediate component 32, which can be simply positioned between the base 31 and body 2, engaged with the base 31 or body 2 individually, or eliminated entirely.

Figure 3:
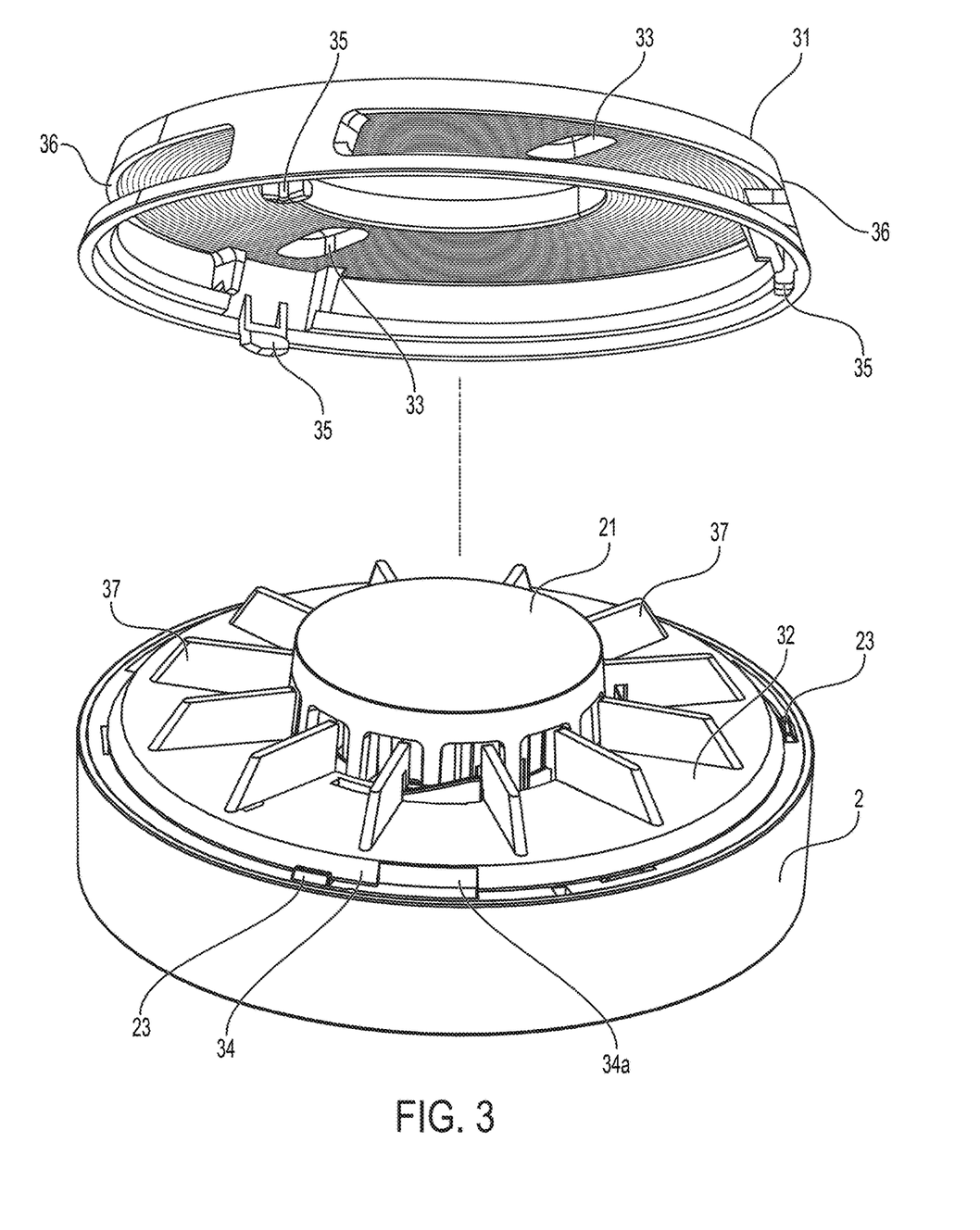
FIG. 3 is an exploded view of the FIG. 1 smoke detector with the detector body and intermediate component removed from the mount base.

FIG. 3 shows an exploded view of the FIG. 1 embodiment with the base 31 separated from the intermediate component 32 and body 2. In some embodiments, the base 31 is configured to be secured to a ceiling, wall or other surface, and may have suitable features to enable such engagement, e.g., one or more openings 33 to receive fasteners that are secured to the surface, adhesive and/or hook and loop fasteners, hooks, etc. Thus, the base 31 can be secured to the ceiling or other surface separate from the intermediate component 32 and body 2, and thereafter the intermediate component 32 and body 2 can be engaged with the base 31 to secure the detector 1 to the surface. In some embodiments, the intermediate component 32 and the base 31 can be configured to engage by rotation of the intermediate component 32 relative to the base 31. Thus, if the intermediate component 32 is engaged with the body 2, the body 2 and intermediate component 32 can be engaged with the base 31 by rotating the body 2 and intermediate component 32 relative to the base 31. In some embodiments, the intermediate component 32 includes a periphery having one or more tabs 34 configured to engage with a corresponding hook 35 on the base 31. As an example, the periphery of the intermediate component 32 can include a notch 34a adjacent a corresponding tab 34 configured to receive the hook 35 of the base 31 when the base 31 and intermediate component 32 are positioned adjacent each other. With a hook 35 positioned in a corresponding notch 34a, the intermediate component 32 (and attached body 2) can be rotated relative to the base 31 to position a portion of the hooks 35 below a corresponding tab 34 and thereby engage the intermediate component 32 (and body 2) with the base 31. Other arrangements can be used to engage the intermediate component 32 with the base 31, such as keyhole slot and cleat engagement features, bayonet connectors, spring tabs, threads, a cam and cam follower engagement, etc.

FIG. 3 also illustrates that in some embodiments the base 31 can be configured to define a cavity, e.g., into which a portion of the intermediate component 32 and/or a portion of the body 2 can be received. The base 31 can also be configured to permit air flow into the cavity, e.g., via one or more openings 36 at the sidewall of the base 31. That is, the base 31 can include an upper wall (e.g., that is positioned against a ceiling or other surface) and a sidewall that extends downwardly from the upper wall. The sidewall can define the cavity with the upper wall and can include the openings 36 to permit air flow into the cavity. Air that enters the cavity or other space (e.g., defined by the base 31 and intermediate component 32) can be received by one or more detector components of the detector body 2, which may be at least partially positioned in the cavity or other space. In some embodiments, the intermediate component 32 can be configured to interact with air in the cavity, e.g., to direct air flow to a portion of the detector body 2 where a detector component is located. For example, the intermediate component 32 can include one or more fins 37 or other features to direct air flow toward a detector component of the detector body 2 or other portion 21 of the detector body 2 that is configured to receive air from the cavity or space defined by the base 31 and intermediate component 32. The fins 37 can be equally spaced around the intermediate component 32 and extend radially outward, e.g., from an opening 38. The intermediate component 32 can include other air flow influencing features, such as baffles, diffusers, turbulence inducing elements, restrictors, etc. depending on the desired effect on air in the cavity, and different intermediate components 32 can be employed to have different effects on air in the cavity. One or more portions of the base 31 can include air flow features as well, e.g., to direct air flow, create turbulence or mixing effects, etc. In some embodiments, the base 31 can include fins, ribs or other features that are arranged counter or transverse to fins or other air flow features 37 of the intermediate component 32. FIG. 3 shows an option where the base 31 includes concentric rings, ribs or fins, e.g., that have a center at about a center of the opening 38 of the intermediate component 32. These concentric ribs can be generally perpendicular to a nearby fin 37 and can disrupt or cause turbulence in air flow along the direction of the fin 37. Of course, other air flow feature arrangements on the base 31 can be provided.

Figure 4:
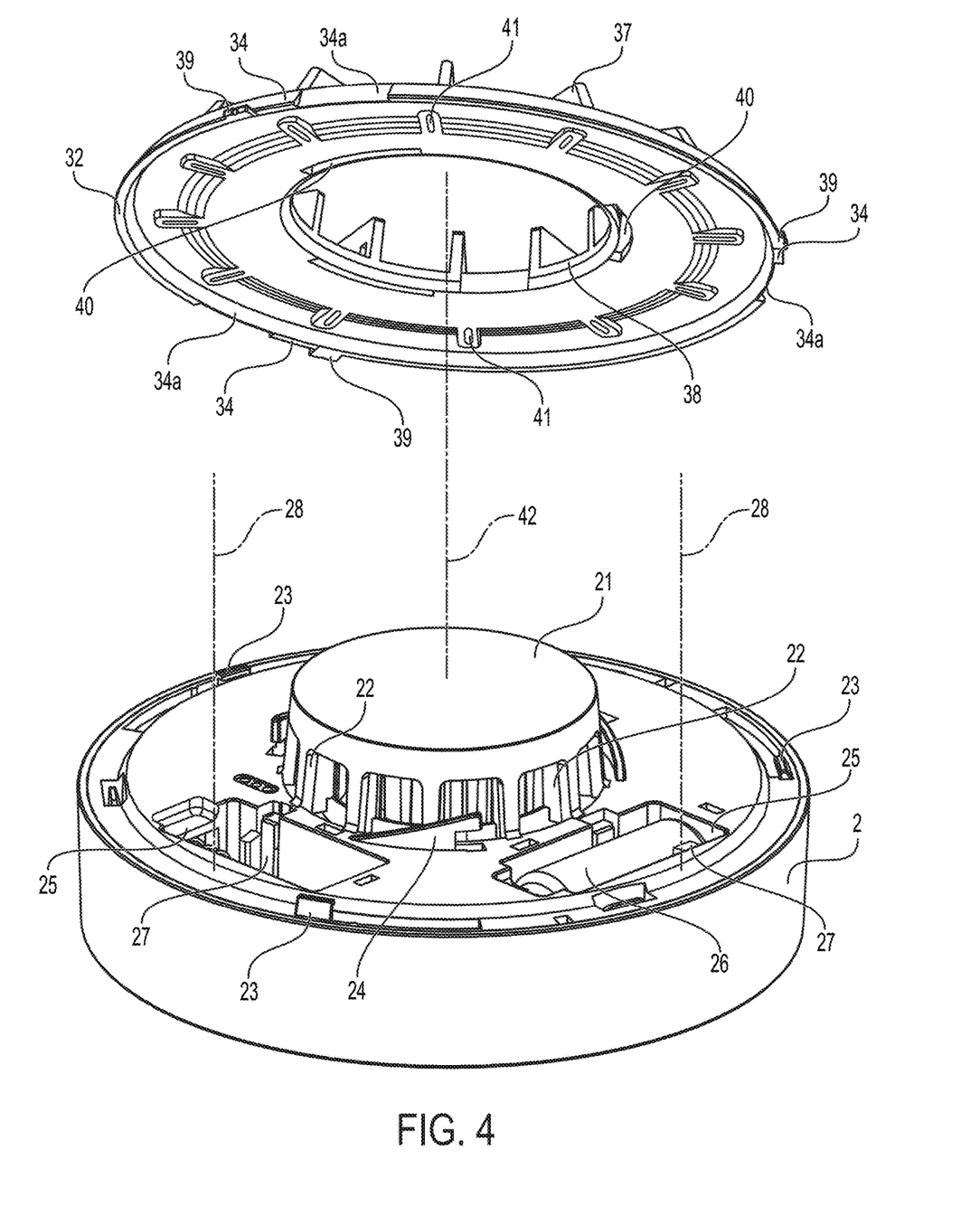
FIG. 4 is an exploded view of the FIG. 1 smoke detector with the intermediate component separated from the detector body.

In some embodiments, the fins or other air flow features 37 can be configured to direct air flow radially inward toward a center of the intermediate component 32 or other location where the detector body 2 can receive air. For example, FIG. 4 shows an exploded view of the intermediate component 32 and detector body 2 and illustrates that in some embodiments the intermediate component 32 can include an opening 38 through which a portion 21 of the detector body 2 can extend and/or receive air. In some cases, the fins 37 can be configured to direct air flow toward the opening 38, and the opening 38 can be located in a center of the intermediate component 32. In some embodiments, a portion 21 of the detector body 2 can extend through the opening 38, e.g., when the intermediate component 32 is engaged with the body 2. The portion 21 can be configured to receive air from the cavity and/or to position at least a part of a detector component in the cavity. In some embodiments, the portion 21 can include one or more openings 22 through which air can enter the body 2.

Figure 5:
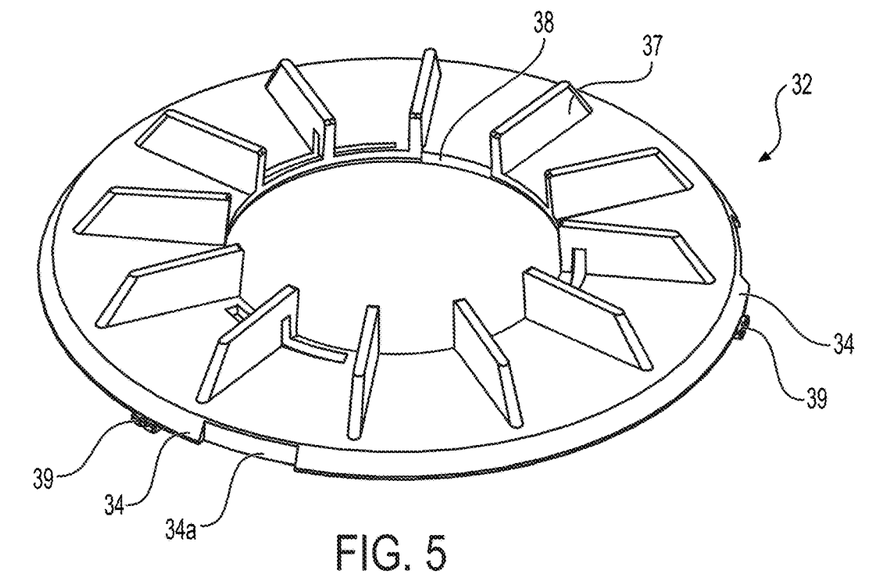
FIG. 5 is a top perspective view of the intermediate component of FIG. 1.
Figure 6:
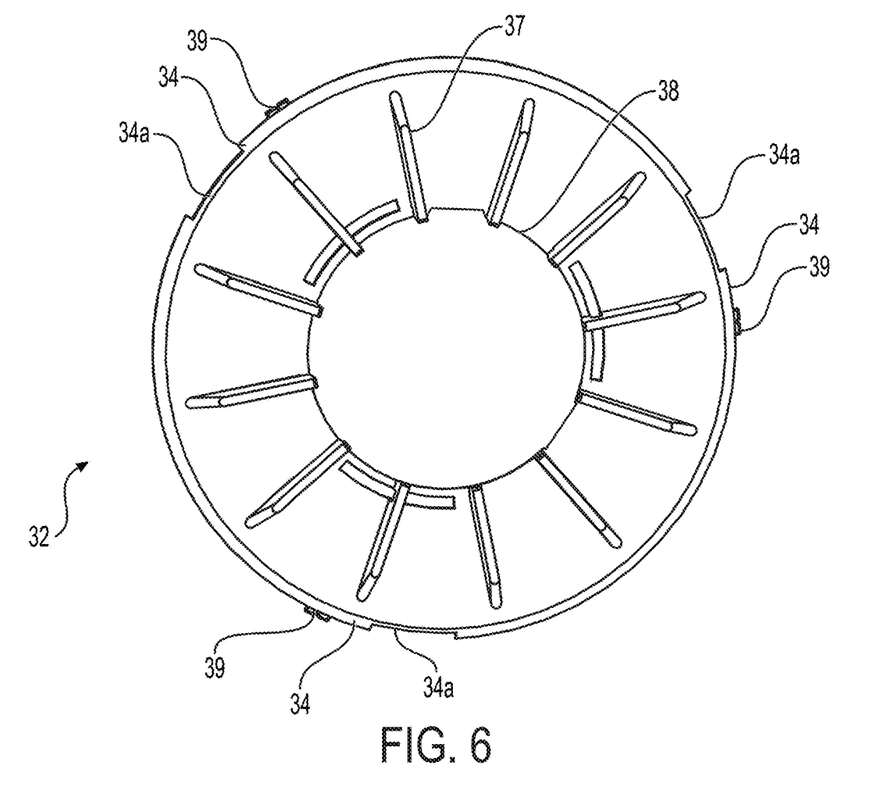
FIG. 6 is a top view of the intermediate component of FIG. 1.

In some embodiments, the intermediate component 32 can be removably engageable with the detector body 2, and can be engaged/disengaged by rotation of the intermediate component 32 relative to the detector body. In some cases, the intermediate component can have a periphery with one or more tabs 39 configured to engage with a corresponding hook 23 on the detector body 2. FIGS. 5 and 6 show top perspective and top views of the intermediate component 32 and illustrate how the tabs 39 can extend radially outwardly from an outer periphery of the intermediate component 32. In some embodiments, the intermediate component 32 can have three tabs 39 spaced 120 degrees apart around the periphery of the intermediate component 32. The hooks 23 on the detector body 2 can be similarly positioned and configured so that the periphery of the intermediate component 32 can be received into an area between the hooks 23 so long as the tabs 39 are positioned away from the hooks 23. With the intermediate component 32 in the area between the hooks 23, the intermediate component 32 can be rotated, e.g., clockwise, relative to the body 2 so that the tabs 39 are received and captured by a corresponding hook 23. The tabs 39 and/or hooks 23 can include a stop so that rotation of the intermediate component 32 beyond a certain point is prevented, e.g., when the tabs 39 are suitably engaged by the hooks 23, further rotation of the intermediate component 32 can be prevented by the stops. In some embodiments, the hooks 23 can function as stops for engagement of the base 31 with the intermediate component 32. For example, with the hooks 35 of the base 31 received into the notches 34a and the intermediate component 32 rotated so the hooks 35 engage with the tabs 34, the hooks 35 may move into contact with the hooks 23 on the detector body 2. At that point, further rotation of the base 31 relative to the intermediate component 32 and body 2 can be stopped by the hooks 23.

In some embodiments, the intermediate component 32 can engage with the detector body 2 in other, or additional, ways than by the hook and tab engagement at the periphery of the intermediate component 32. For example, in some embodiments the detector body 2 can include one or more catches 24 that are configured to engage with a corresponding slot 40 on the intermediate component 32 as shown in FIG. 4. In some embodiments, the detector body 2 can include three catches 24 positioned at circumferentially equidistant positions on the body 2 so the catches 24 all engage with a corresponding slot 24 of the intermediate component 32. For example, the intermediate component 32 can be positioned on the body 2 so that an upper portion of the catches 24 is received into a corresponding slot 40 of the intermediate component 32. With each catch 24 received in a corresponding slot 40, the intermediate component 32 can be rotated, e.g., clockwise, relative to the body 2 so that a portion of the intermediate component 32 at an end of each slot 40 is captured in a hook or recess of the catch 24. This can secure the intermediate component 32 to the detector body 2, e.g., so the intermediate component 32 cannot be removed from the body 2 without counterclockwise rotation.

In some embodiments, the catches 40 can include a ramp at an upper surface as shown in FIG. 4 that is configured to engage with and move the intermediate component 32 toward and away from the detector body 2 in response to rotation of the intermediate component relative to the body 2. For example, the intermediate component 32 can be positioned on the body 2 so an upper portion of the catches 24 that forms a ramp is received into a corresponding slot 40 of the intermediate component 32. As the intermediate component 32 is rotated, a first end of each slot 40 will ride along a corresponding ramp surface of a catch 24 and thus move the intermediate component 32 toward or away from the body 2 depending on the direction of rotation. If the intermediate component 32 is rotated in a clockwise direction, a first end of each slot 40 will ride downwardly along the ramp surface of the catches 24, allowing the intermediate component 32 to move gradually toward the body 2 as the intermediate component 32 is rotated and until the intermediate component is fully seated on the body 2. Further clockwise rotation of the intermediate component 32 once it is seated will cause a portion of a second end of each slot 40 opposite the first end to be received into a hook or recess of a corresponding catch 24, thereby engaging the intermediate component 32 with the body 2. Counterclockwise rotation of the intermediate component 32 will disengage the second end of each slot from the catch 24 and cause the first end of each slot 40 to ride upwardly along the ramp surface of a corresponding catch 24 as the intermediate component 32 is rotated. This upward riding of the first end of each slot 40 along the ramp surface of the catch 24 will gradually move the intermediate component 32 away from the detector body 2. Thus, the intermediate component 32 and the detector body 2 can be configured to engage by rotation of the intermediate component 32 in a first direction (e.g., clockwise) relative to the detector body 2, and the ramp on a catch 24 can be configured to engage with and move the intermediate component 32 toward the detector body 2 as the intermediate component 32 is rotated in the first direction toward engagement with the body 2. The ramp engagement can help ensure proper alignment and engagement of the intermediate component 32 with the body 2, e.g., by controlling movement of the intermediate component 32 toward the body 2 during rotation as first ends of the slots 40 follow the contour of a corresponding ramp during rotation of the intermediate component 32. In addition, the intermediate component 32 and the detector body 2 can be configured to disengage by rotation of the intermediate component 32 in a second direction (e.g., counterclockwise) opposite the first direction such that the intermediate component 32 moves away from the detector body 2 in response to rotation of the intermediate component 32 in the second direction (e.g., counterclockwise). This arrangement can help ensure that the intermediate component 32 is suitably disengaged from the body 2 in response to rotation of the intermediate component 32 relative to the body 2. Note that engagement of the intermediate component 32 with the body 2 can be achieved by the catches 24 and slots 40 only, and without any engagement features at the periphery of the intermediate component 32.

Another feature of the intermediate component 32 is that the intermediate component 32 can operate to at least partially cover a battery location 25 where a battery 26 (a battery 26 is at the battery location 25 on the right in FIG. 4) can be received and held for use by electronic components of the smoke detector, e.g., to receive power from the battery 26 and/or to charge or maintain a state of charge of the battery 26. For example, the intermediate component 32 can help hold the battery 26 in the battery location 25, e.g., so the battery 26 maintains proper electrical contact with components of the detector 1.

In some embodiments, the battery location 25 can include a tamper indicator 27 configured for movement between a first position in which the tamper indicator 27 is positioned when a battery 26 is held in the battery location 25 and a second position in which the tamper indicator 27 is positioned when no battery 26 is held in the battery location 26. The tamper indicator 27 and the intermediate component 32 or other part of the detector mount (such as the base 31) can be configured to prevent engagement of the detector body 2 with the intermediate component 32 (or other part of the detector mount) if the tamper indicator 27 is in the second position. This can help ensure that a battery 26 is provided with the smoke detector 1 during operation because the detector 1 can be prevented from being mounted to a ceiling or other surface if a battery 26 is not at the battery location 25. For example, where a detector mount includes an intermediate component 32, the tamper indicator 27 in the second position can prevent portions of the intermediate component 32 (such as tabs 39 or slots 40) from being positioned suitably adjacent portions of the detector body 2 (such as hooks 23 or catches 24) for engagement. As described above, in embodiments where the intermediate component 32 is required to mount the detector body 2 to the base 31, failure of the intermediate component 32 to engage with the body 2 will prevent mounting of the body 2 to the base 31 as well. Conversely, the tamper indicator 27 can permit engagement of the detector body 2 with the detector mount (e.g., the intermediate component 32 and/or base 31) if the tamper indicator 27 is in the first position. For example, the tamper indicator 27 in the first position can permit engagement of the intermediate component 32 with the body 2, and thus engagement of the body 2 with the base 31.

In FIG. 4, the battery location 25 on the left does not hold a battery 26 and so the tamper indicator 27 is in the second position. In the second position, a portion of the tamper indicator 27 extends upwardly from an upper surface of the detector body 2 (e.g., positioned around the battery location 25) and/or from a corresponding battery location 25 and so prevents engagement of the intermediate component 32 (or other detector mount portion) with the detector body 2. For example, as described above, the intermediate component 32 can be configured to engage the detector body 2 by fitting tabs 39 underneath a portion of a corresponding hook 23 as the intermediate component 32 is rotated relative to the body 2. However, when in the second position, the tamper indicator 27 can hold the intermediate component 32 suitably far away from the detector body 2 so that one or more tabs 39 cannot engage with a corresponding hook 23, thus preventing engagement of the intermediate component 32 with the detector body 2. In addition, or alternately, the tamper indicator 27 can hold the intermediate component 32 suitably far away from the detector body 2 so that the catches 24 cannot engage the intermediate component 32 at a corresponding slot 40. As a result, by inability of the intermediate component 32 to engage with the detector body 2 a user can receive an indication that a battery 26 is missing from a battery location 25.

The tamper indicator 27 is not limited to preventing engagement of the intermediate component 32 or other detector mount 3 element with the body 2 by preventing components from being positioned suitably adjacent each other. For example, when the tamper indicator 27 in the second position, the tamper indicator 27 can engage the intermediate component 32 or other detector mount part so as to prevent rotation relative to the body 2, e.g., so as to prevent engagement of the intermediate component 32 with the body 2. For example, in some embodiments the intermediate component 32 can include one or more engagement features 41 such as ribs, tabs, notches, grooves, fins, etc., that extend from or into a lower surface of the intermediate component 32 and are configured to engage with the tamper indicator 27 in the second position to prevent rotation of the intermediate component 32 relative to the body 2. With this type of arrangement, the tamper indicator 27 need not necessarily hold the intermediate component 32 suitably far away to prevent engagement of the tabs 29/hooks 23 or catches 24/slots 40. Instead, the intermediate component 32 may be permitted to be positioned adjacent to the body 2 (e.g., suitably close for engagement), but the engagement features 41 can prevent relative rotation of the intermediate component 32 and the body 2 needed for engagement of the two.

In some embodiments, the tamper indicator 27 can be configured to pivot about a pivot axis 28 between the first and second positions. In some cases, the pivot axis 28 can be oriented along a direction in which the battery 26 is received at the battery location 25. In some embodiments, the detector body 2 can have a rear surface arranged in a plane, e.g., around the battery location 25, and the pivot axis 28 can be oriented perpendicular to the plane. In some embodiments, the detector body 2 and at least a portion of the detector mount, such as the intermediate component 32, are configured to engage by relative rotation about an engagement axis 42, and the tamper indicator 27 can be configured to pivot about a pivot axis 28 that is oriented along a direction parallel to the engagement axis 42. As can be seen at the left tamper indicator 27 in FIG. 4, the tamper indicator 27 can have a portion that extends upwardly out of the battery location 25 when in the second position, whereas the tamper indicator 27 can be positioned within or flush with an entrance to the battery location 25 when in the first position as shown at the right tamper indicator 27 in FIG. 4.

Figure 7:
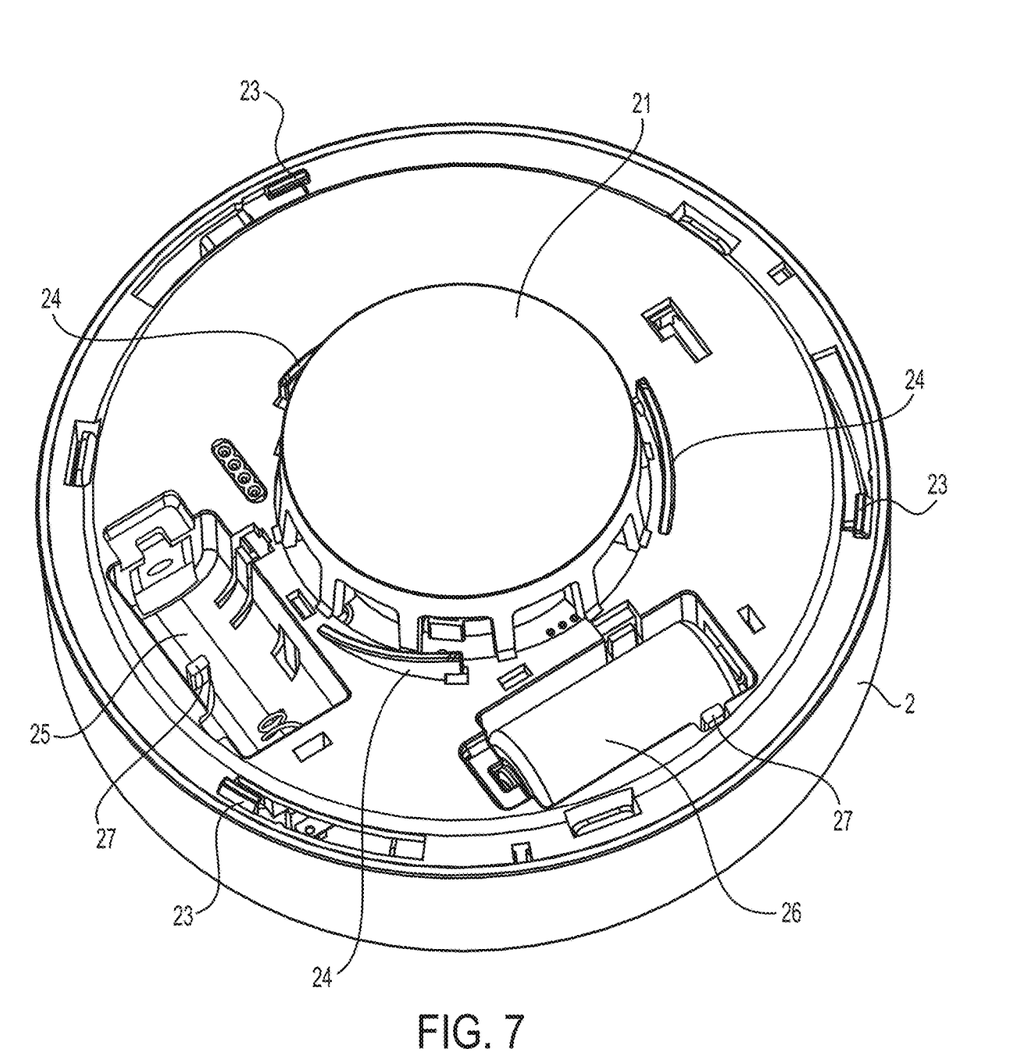
FIG. 7 is a top perspective view of the detector body of FIG. 1.

To achieve this type of movement between the first and second positions, the tamper indicator 27 can be configured to both pivot about the pivot axis 28 and slide along the pivot axis 28, e.g., so as to move out of and/or into the battery location 25 during pivoting between the first and second positions. For example, as can be seen in FIG. 7, the tamper indicator 27 can be configured to pivot within the battery location 25 about the pivot axis 28 between the first and second positions and to have a portion that extends out of the battery location 25 when the tamper indicator 27 is in the second position. For example, the tamper indicator 27 can be resiliently biased to move toward the second position and configured such that a battery 26 at the battery location 25 holds the tamper indicator 27 at the first position. In FIG. 7, the battery location 25 on the left has no battery 26 positioned at the location 25 and so the tamper indicator 27 is in the second position. In this case, the tamper indicator 27 pivots within the battery location 25 about the pivot axis 28 from the first to the second position. When in the second position, the tamper indicator 27 can not only prevent engagement of the intermediate component 32 with the body 2, but also prevent a battery 26 from being placed at the battery location 25 unless the tamper indicator 27 is moved. To place a battery 26 in the battery location 25 on the left, a user can pivot the tamper indicator 27 in a clockwise direction (as seen in FIG. 7) to the first position by hand against a spring bias that urges the tamper indicator 27 to move to the second position. While holding the tamper indicator 27 at the first position, the battery 26 can be placed at the battery location 25 as can be seen at the right battery location 25 in FIG. 7. Alternately, a user can use the battery 26 to move the tamper indicator 27 to the first position as the battery 26 is placed at the battery location 25. For example, a user can slide the battery 26 into the battery location 25 from one end of the location 25 so that a leading end of the battery 26 contacts the tamper indicator 27 and pivots the indicator 27 to the first position as the battery 26 is further inserted into the battery location 25. When received at the battery location 25, the battery 26 can hold the tamper indicator 27 at the first position as shown on the right in FIG. 7, thereby enabling engagement of the intermediate component 32 with the body 2 (provided a battery 26 is at both battery locations 25 so both tamper indicators 27 are at the first position; in some embodiments only one battery location 25 and/or one tamper indicator 27 need be employed).

Figure 8:
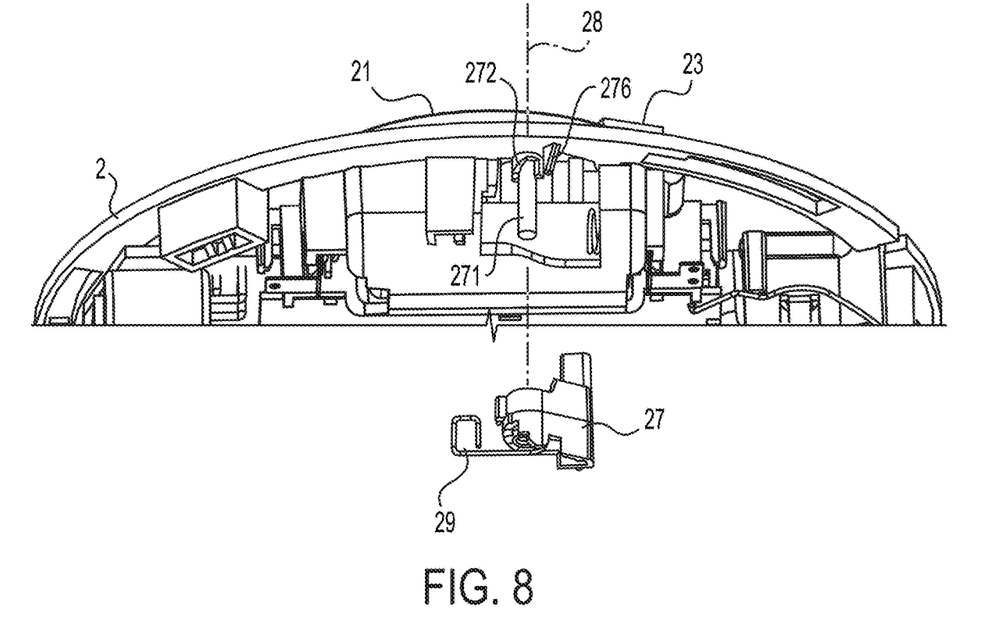
FIG. 8 is a partial cutaway view of the detector body illustrating a tamper indicator.
Figure 9:
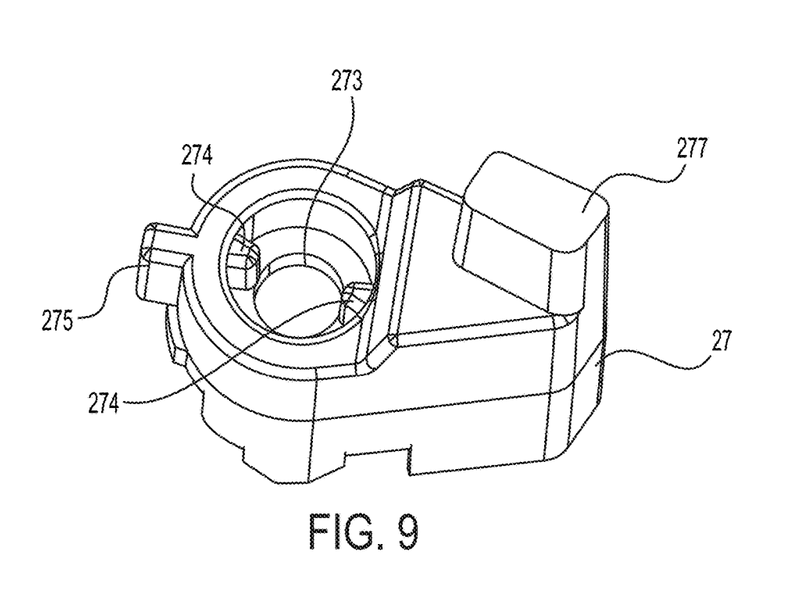
FIG. 9 is a top perspective view of a tamper indicator.

The tamper indicator 27 can be configured to move between first and second positions in any suitable way. In some embodiments, the tamper indicator 27 moves along a spiral ramp between the first and second positions. For example, FIG. 8 shows a lower perspective view of a portion of the detector body 2 where the tamper indicator 27 is mounted. In this embodiment, the tamper indicator 27 is mounted on a shaft 271 of the detector body 2 that includes a pair of spiral ramps 272 (only one ramp 272 is shown in FIG. 8; a second ramp 272 is on a rear side of the shaft 271). As can be seen in FIG. 9, the tamper indicator 27 includes an opening 273 that receives the shaft 271 so the tamper indicator 27 can pivot about the pivot axis 28 on the shaft 271. A pair of cam followers 274 are configured in a portion of the opening 273 (e.g., a counterbore portion of the opening 273) to engage with a corresponding spiral ramp 272 at a base of the shaft 271. The spiral ramps 272 and cam followers 274 are configured so that when the tamper indicator 27 pivots to the first position, the tamper indicator 27 moves downwardly on the shaft 271 as well as pivoting about the pivot axis 28. Conversely, when the tamper indicator 27 pivots to the second position, the spiral ramps 272 and cam followers 274 are configured so that the tamper indicator 27 moves upwardly on the shaft 271 as well as pivoting about the pivot axis 28. A torsion spring 29 or other resilient element can be provided to bias or otherwise urge the tamper indicator 27 to move to the second position and/or upwardly on the shaft 271. Thus, if no battery 26 is at a battery location 25, the tamper indicator 27 will tend to move to the second position. However, with the tamper indicator 27 in the first position, a battery 26 can be placed at the battery location 25 and can hold the tamper indicator 27 in the first position so long as the battery 26 is at the battery location 25. The tamper indicator 27 and/or detector body 2 can include one or more stops to determine where the tamper indicator 27 is located at the first and second positions. For example, the tamper indicator 27 can include a stop 275 that can contact a corresponding stop 276 on the detector body 2 when the tamper indicator 27 is at the second position. To define the position of the tamper indicator 27 at the first position, a pin 277 of the tamper indicator 27 can contact a portion of the body 2 at the battery location 25. The pin 277 can also function to contact the intermediate component 32 to prevent engagement of the intermediate component 32 with the detector body 2 when the tamper indicator 27 is in the second position. As described above, the intermediate component 32 engages with the detector body 2 by rotation in a clockwise direction about the engagement axis 42 relative to the detector body 2. The pin 277 can engage with the intermediate component 32, e.g., at the engagement features 41, to prevent rotational movement of the intermediate component 32 relative to the detector body 2. The stops 275, 276 can resist movement of the tamper indicator 27 beyond the second position (e.g., counterclockwise rotation of the tamper indicator 27 about the pivot axis 28 past the second position) and so help prevent engagement of the intermediate component 32 with the body 2.

Operation of the smoke detector components, such as one or more sensors to detect smoke, fire, heat, carbon monoxide, fine particulates, etc. can be controlled by a controller, which can include a programmed processor and/or other data processing device along with suitable software or other operating instructions for performing desired functions, one or more memories (including non-transient storage media that can store software and/or other operating instructions), sensors, input/output interfaces (such as a user interface on the housing), communication modules (e.g., for wired and/or wireless communication), buses or other links, a display, switches, relays, triacs, a speaker or other noise making device, a battery or other power source or supply, or other components necessary to perform desired input/output, control or other functions. A user interface can be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

While systems and methods have been described with reference to various illustrative embodiments, such systems and methods are not limited to the embodiments described. Thus, it is evident that many alternatives, modifications, and variations of the embodiments described will be apparent to those skilled in the art. Accordingly, embodiments as set forth herein are intended to be illustrative, not limiting.

The invention claimed is:

1. A smoke detector comprising:
    a detector body including components to detect an environmental condition at the smoke detector; and
    a detector mount configured to be secured to a surface and to support the smoke detector on the surface, the detector mount including a base configured to be secured to the surface and an intermediate component configured to removably engage with both the base and the detector body such that the base is engaged with the detector body via the intermediate component.

2. The smoke detector of claim 1, wherein the intermediate component includes fins to direct air flow toward a detector component of the detector body.

3. The smoke detector of claim 2, wherein the intermediate component includes an opening through which the detector component receives air and wherein the fins are configured to direct air flow toward the opening.

4. The smoke detector of claim 3, wherein the opening is located at a center of the intermediate component and a portion of the detector body extends through the opening.

5. The smoke detector of claim 1, wherein the intermediate component and the detector body are configured to engage by rotation of the intermediate component relative to the detector body.

6. The smoke detector of claim 5, wherein the intermediate component includes a periphery having one or more tabs configured to engage with a corresponding hook on the detector body.

7. The smoke detector of claim 5, wherein the detector body includes one or more hooks configured to engage with a corresponding slot of the intermediate component.

8. The smoke detector of claim 7, wherein the intermediate component and the detector body are configured to engage by rotation of the intermediate component in a first direction relative to the detector body, and wherein the one or more hooks each include a ramp configured to engage with and move the intermediate component away from the detector body in response to rotation of the intermediate component in a second direction opposite the first direction.

9. The smoke detector of claim 1, wherein the intermediate component and the base are configured to engage by rotation of the intermediate component relative to the base.

10. The smoke detector of claim 9, wherein the intermediate component includes a periphery having one or more tabs configured to engage with a corresponding hook on the base.

11. The smoke detector of claim 1, wherein the intermediate component is configured to at least partially cover a battery location of the detector body when the intermediate component is engaged with the detector body.

12. The smoke detector of claim 1, wherein the base includes a sidewall with openings to permit air flow into a space defined by the base and the intermediate component and to a detector component of the detector body.

13. The smoke detector of claim 10, wherein a portion of the detector body extends into the space defined by the base and the intermediate component and is configured to receive the air flow from the space and to the detector component.

14. A smoke detector comprising:
    a detector body including a detector component to detect an environmental condition at the smoke detector; and
    a detector mount configured to be secured to a surface and to support the smoke detector on the surface, the detector mount including a base configured to be secured to the surface, the base defining a cavity and having a sidewall with one or more openings to admit air into the cavity,
    wherein the detector body is configured to receive air from the cavity for detecting the environmental condition using the detector component.

15. The smoke detector of claim 14, wherein the detector mount includes an intermediate component configured to removably engage with both the base and the detector body such that the base is engaged with the detector body via the intermediate component.

16. The smoke detector of claim 14, wherein the detector mount includes an intermediate component configured to direct air flow in the cavity toward an air receiving area of the detector body.

17. The smoke detector of claim 14, wherein the detector mount includes an intermediate component configured to at least partially enclose the cavity with the base.

18. The smoke detector of claim 17, wherein a portion of the detector body extends into the cavity defined by the base and the intermediate component and is configured to receive the air flow from the cavity.

19. The smoke detector of claim 17, wherein the intermediate component includes fins to direct air flow toward the detector component of the detector body.

20. The smoke detector of claim 19, wherein the intermediate component includes an opening through which the detector component receives air and wherein the fins are configured to direct air flow toward the opening.

\* \* \* \* \*